United States Patent [19]
Piazza

[11] Patent Number: 5,970,850
[45] Date of Patent: Oct. 26, 1999

[54] COFFEE, TEA AND HERBAL TEA MAKER

[76] Inventor: Pietro Piazza, 11 Catherine Dr., Prospect, Conn. 06712

[21] Appl. No.: 09/145,620

[22] Filed: Sep. 2, 1998

Related U.S. Application Data

[60] Provisional application No. 60/056,283, Sep. 3, 1997.

[51] Int. Cl.$^6$ .................................................. A47S 31/24
[52] U.S. Cl. ............................................ 99/303; 99/302 P
[58] Field of Search .................................. 99/303, 302 P, 99/287, 292, 308; 426/433

[56] References Cited

U.S. PATENT DOCUMENTS

| 3,077,156 | 2/1963 | Egi et al. | 99/303 X |
| 3,670,641 | 6/1972 | Mancioli | 99/303 X |
| 5,586,484 | 12/1996 | Piazza | 99/287 |

FOREIGN PATENT DOCUMENTS

| 1176466 | 4/1959 | France | 99/303 |
| 580064 | 7/1958 | Italy | 99/303 |
| 359859 | 3/1962 | Switzerland | 99/303 |

*Primary Examiner*—Reginald L. Alexander
*Attorney, Agent, or Firm*—C. G. Nessler

[57] ABSTRACT

A device for brewing hot beverages comprises a lower container for receiving water, an upper container for receiving brewed beverage, and a piston-cylinder assembly into which coffee grounds, tea leaves, and herbs are placed. The grounds, etc. are compressed and subjected to high temperature water and steam, to extract essences and produce a beverage, such as espresso coffee. The piston has a decompression chamber at its upper end, formed between the piston top and a perforated diffuser plate. Pressurized hot water from the lower container flows through a nozzle in the piston top, into the decompression chamber, through the holes of the diffuser plate, and then into the grounds. The piston moves upwardly to compress the grounds against an upper perforated plate, first with rising force, and then with constant force. Since the total flow path cross sectional area of the holes in the diffuser plate is several times greater than the flow area of the piston top nozzle, the pressure in the decompression chamber is substantially lower than the pressure in the lower container. This enables a lowered velocity of water and steam which pass through the diffuser plate and into the grounds.

9 Claims, 6 Drawing Sheets

COFFEE, TEA AND HERBAL TEA MAKER

The present application claims benefit of Provisional patent application Ser. No. 60/056,283, filed Sep. 3, 1997.

TECHNICAL FIELD

The present invention relates to devices used for making hot beverages from organic substances, such as ground coffee beans, tea leaves, and herbs.

BACKGROUND

This invention has relation to the invention described in U.S. Pat. No. 5,586,484, "Expresso Coffee Maker", which has commnon inventorship and ownership herewith. The patent describes a two-container coffee maker in which coffee grounds are placed within a subassembly called the coffee basket assembly. The coffee basket assembly comprises a hollow cylinder piece and a piston. During the brewing cycle, the steam generated in the lower container of the maker causes the piston to move upwardly, compressing the grounds between the piston and a perforated plate at the bottom of the upper container. Superheated water and steam from the lower heating container are forced through the coffee grounds. The patented coffee maker subjects the grounds to a unique combination of temperature and compression.

The coffee maker described in the patent is quite useful in extracting essences from the coffee grounds in a quick and efficient manner, producing espresso and other varieties of coffee beverage with outstanding flavor. While effective, the construction of the older invention involved certain high cost elements. For example, the piston top had a plurality of small diameter holes. The hole size and number were chosen to both provide the desired differential pressure across the piston—and resultant compression of the grounds—and to distribute the water and steam through the coffee grounds. Furthermore, continuing research has been conducted to otherwise improve the maker.

SUMMARY

An object of the invention is to provide a maker for coffee, tea and herbal tea which subjects raw brewing ingredients to a combination of compression and flow of high temperature water and steam which efficiently makes beverages, with apparatus which is economical to manufacture.

In accordance with the invention, a device for brewing hot beverages comprises a lower container for receiving and heating water, a connected upper container for receiving beverage, and a piston-cylinder assembly for receiving grounds (or other substance from which beverage is to be made), captured within the lower container. The piston-cylinder assembly comprises a piston having a decompression chamber at its upper end. The chamber is formed between the piston top, which has an orifice functioning as a nozzle in it, and a diffuser plate having a multiplicity of holes, on which the grounds are placed. Water heated in the lower container passes through the piston nozzle at relatively high velocity, and enters the decompression container at lowered pressure. It then flows through the diffuser plate, through the grounds, and into the upper chamber. During this process, the pressure differential applied to the piston causes the piston to move upwardly within the cylinder, to increasingly compress the grounds. Preferably, the flow area of the nozzle is several times less than the flow area of the holes in the diffuser plate. For example, the nozzle opening may be 1 mm diameter and it will have an area only one-twentieth of the multiplicity of diffuser plate holes, such as a preferred 32 holes of 0.8 mm diameter.

The decompression chamber lowers the pressure and velocity of the water which flows into the grounds compared to the pressure and velocity in the absence of the chamber. The pressure in the decompression chamber is substantially less than the pressure in the lower container. Typically the pressure is no more than 50 percent, more typically no more than 15–30 percent of the pressure in the lower container. In an idealized characterization of the brewing cycle, the pressure and compressive force on the grounds is raised gradually at first, while water saturates the grounds. Then, the pressure is held constant while the grounds are compressed. Then, steam is passed through the grounds to remove excess water. Finally, the heat is removed from the lower container, the pressure drops and compressive force is released; and, the piston retracts to its start position.

The invention simplifies the manufacture of a maker for coffee, tea and herbal teas and improves the process. (The term "grounds" in the foregoing text is used for simplicity and is intended to encompass the processing of coffee grounds, tea leaves, herbs, and so forth.) In lowering the pressure of liquid and steam which is delivered for passage through the compressed grounds, the hole sizes of the perforated plate may be made bigger than would otherwise be permitted, thus lowering manufacturing costs. A desirable combination of compression and heating and fluid flow are obtained.

The foregoing and other objects, features and advantages of the invention will become more apparent from the following description of the preferred embodiments and accompanying drawings.

DESCRIPTION

The present invention has relation to the device described in U.S. Pat. No. 5,586,484, entitled Expresso Coffee Maker. The Detailed Description and Figures referred to therein are hereby incorporated by reference. The essential cycle for brewing coffee or the like has been described in the Background here. The present invention subjects coffee grounds and other materials to an improved processing, principally due to the improvement called a decompression chamber.

While the prior invention was described in terms of producing espresso (also referred to as "expresso") coffee from ground coffee beans, both the prior invention and the present invention are adapted to extract essences, etc., from other kinds of organic materials, such as tea and herb leaves and stems, to generate other beverages. For covenience in describing the invention here, such organic raw materials are referred to as "grounds".

In the present invention, the overall water and steam flow path is similar to that of the maker described in the U.S. Pat. No. 5,568,484. What was previously referred to as the basket assembly is now referred to as the piston-cylinder assembly.

Figure 1:
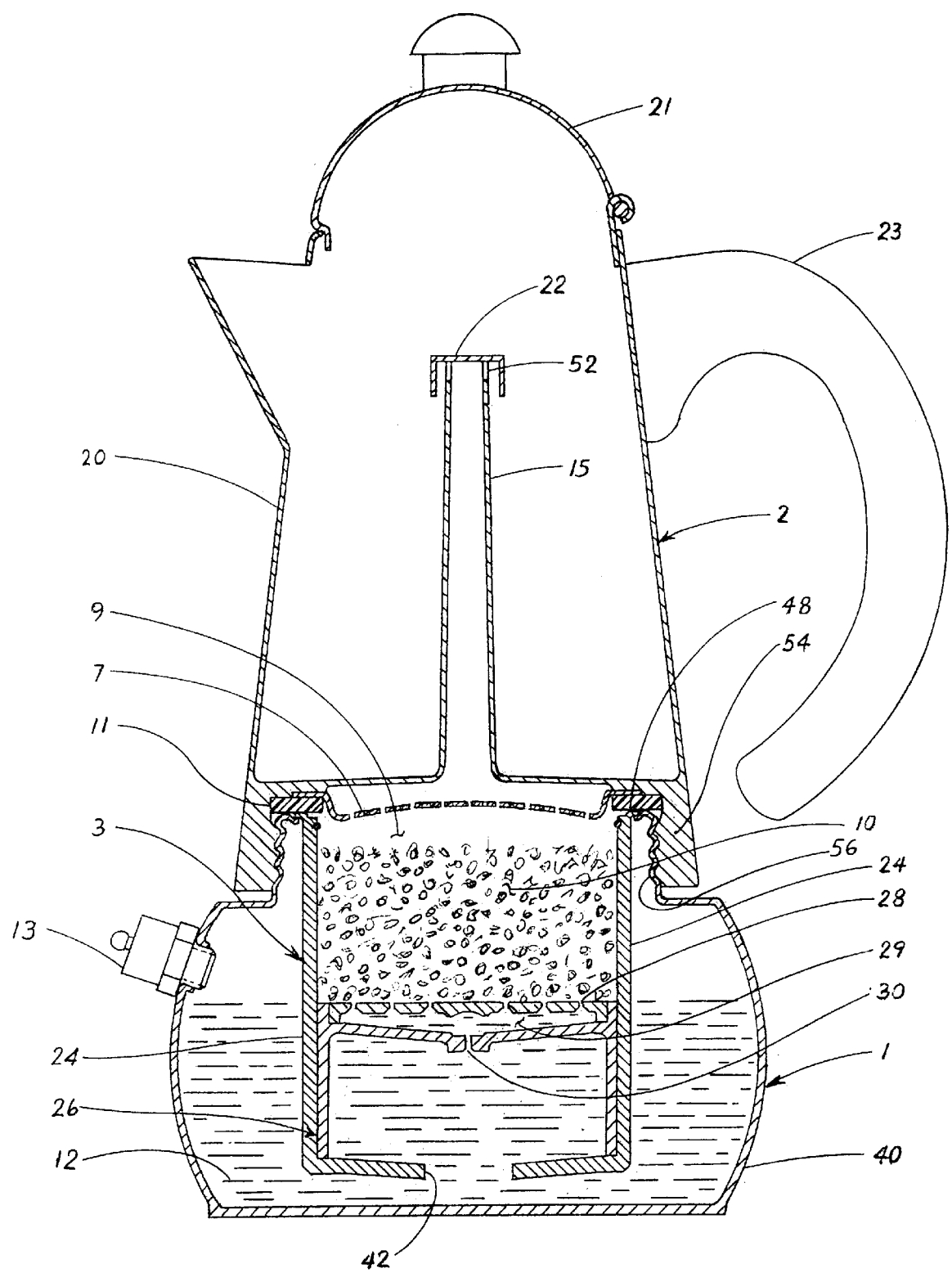
FIG. 1 is a vertical cross sectional centerline view of a beverage maker at the start of the brewing process.

As shown in the vertical centerline cross section of FIG. 1, the brewer is comprised of an upper container assembly 2 for receiving brewed beverage, a lower container assembly 1 for heating water and generating steam, and a piston-cylinder assembly 3 for holding grounds.

The upper container assembly 2 comprises a tapered cylinder container 20, hinged cap 21, handle 23, and a threaded open bottom end 54. Pressed in place within the open bottom end of the upper container assembly is upper perforated plate 7. The upper container assembly has an integral inverted interior funnel 15, the smaller part of which rises vertically as a standpipe. At the upper end of the funnel standpipe is an opening 52 and a cap 22 to divert fluid passing through the opening downwardly.

The lower container assembly 1 comprises a squat oblate container 40, a pressure relief valve 13, and a threaded top 56, which engages the threaded bottom 54 of the upper container assembly. Gasket 11 forms a seal between the two assemblies.

The piston-cylinder assembly 3 comprises a hollow flanged cylinder 24 and piston 26. The top flange 48 of the cylinder 24 is removably captured between the gasket 11 and the threaded top 56 of lower container assembly. When the maker is assembled for use, as shown in FIG. 1, the piston-cylinder assembly 3 projects downwardly within the confines of the lower container assembly 1.

Figure 5:
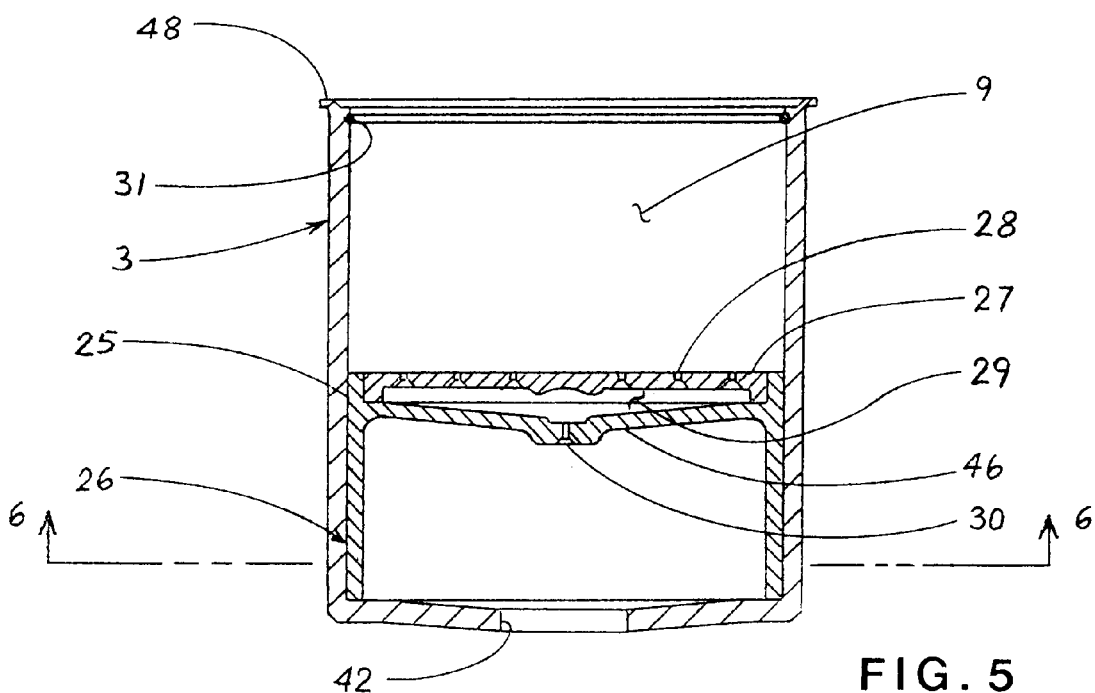
FIG. 5 is a cross sectional elevation view of a piston-cylinder assembly.

With reference to FIG. 1 and 5, the cylinder 24 of piston-cylinder assembly 3 has at its bottom end an opening 42 which is close to the bottom of the inside of lower container assembly. Cylinder 24 has a straight cylindrical shape and an interior finish of 32 microinch AA. The piston 26 fits precisely within the cylinder, to run smoothly up and down. With reference to FIG. 5, it can be seen that in side cross section the piston has the shape of the letter H. A circumferential ring 31, set in a groove at the top of the interior wall of cylinder 24, limits vertical motion of the piston. In a typical construction, the piston has an outside diameter of about 57 mm and a travel path of about 35 mm.

Figure 4:
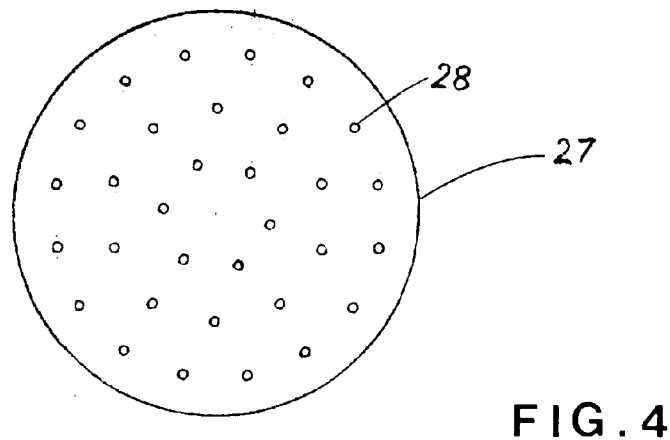
FIG. 4 is a plan view of a diffuser plate.
Figure 6:
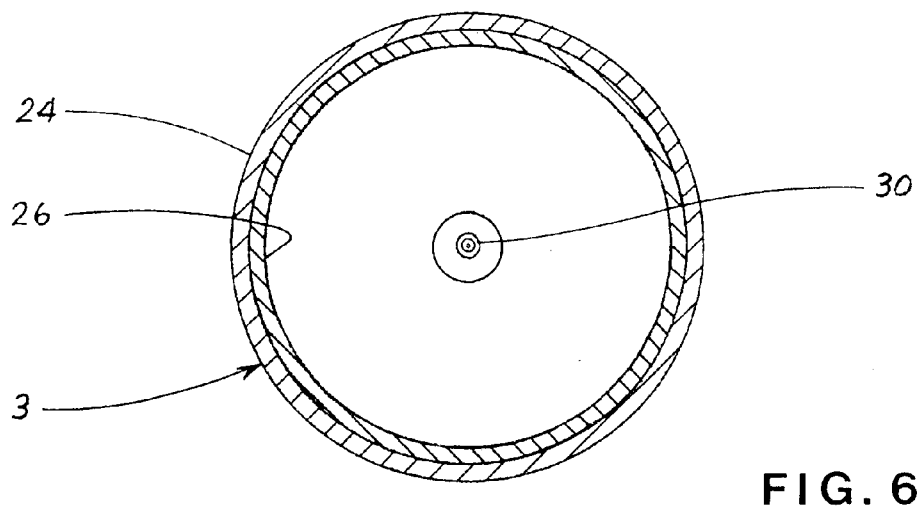
FIG. 6 is a cross sectional view of the piston of the assembly shown in FIG. 5.

The piston has a decompression chamber 29 at its upper end, formed between the piston top 46 and the permanently attached diffuser plate 27. Preferably, the diffuser plate is pressed and bonded within the upper verticals of the H-shape. See FIG. 5. The piston top 46 has a single central nozzle 30. See FIG. 6. The diffuser plate 27, and any diffuser plate in this invention, has a multiplicity of holes 28. See FIG. 4. Preferably, the cylinder, piston and diffuser plate are made of AISI 316 stainless steel. The importance of the relative sizes of opening and the function of the decompression chamber are described below. First, the brewing cycle will be described.

Figure 2:
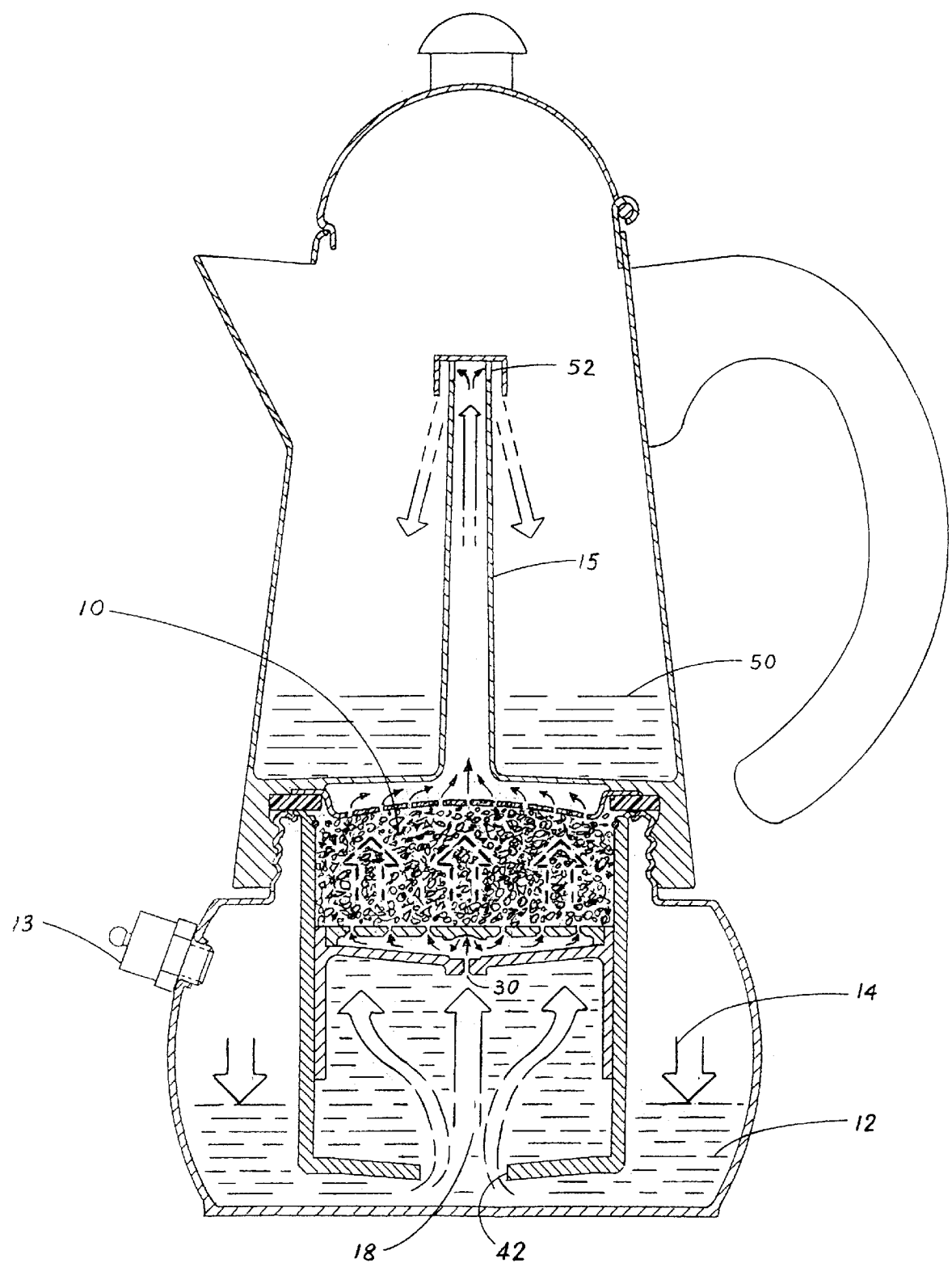
FIG. 2 is like FIG. 1, showing the beverage maker at a second point during the brewing process.
Figure 3:
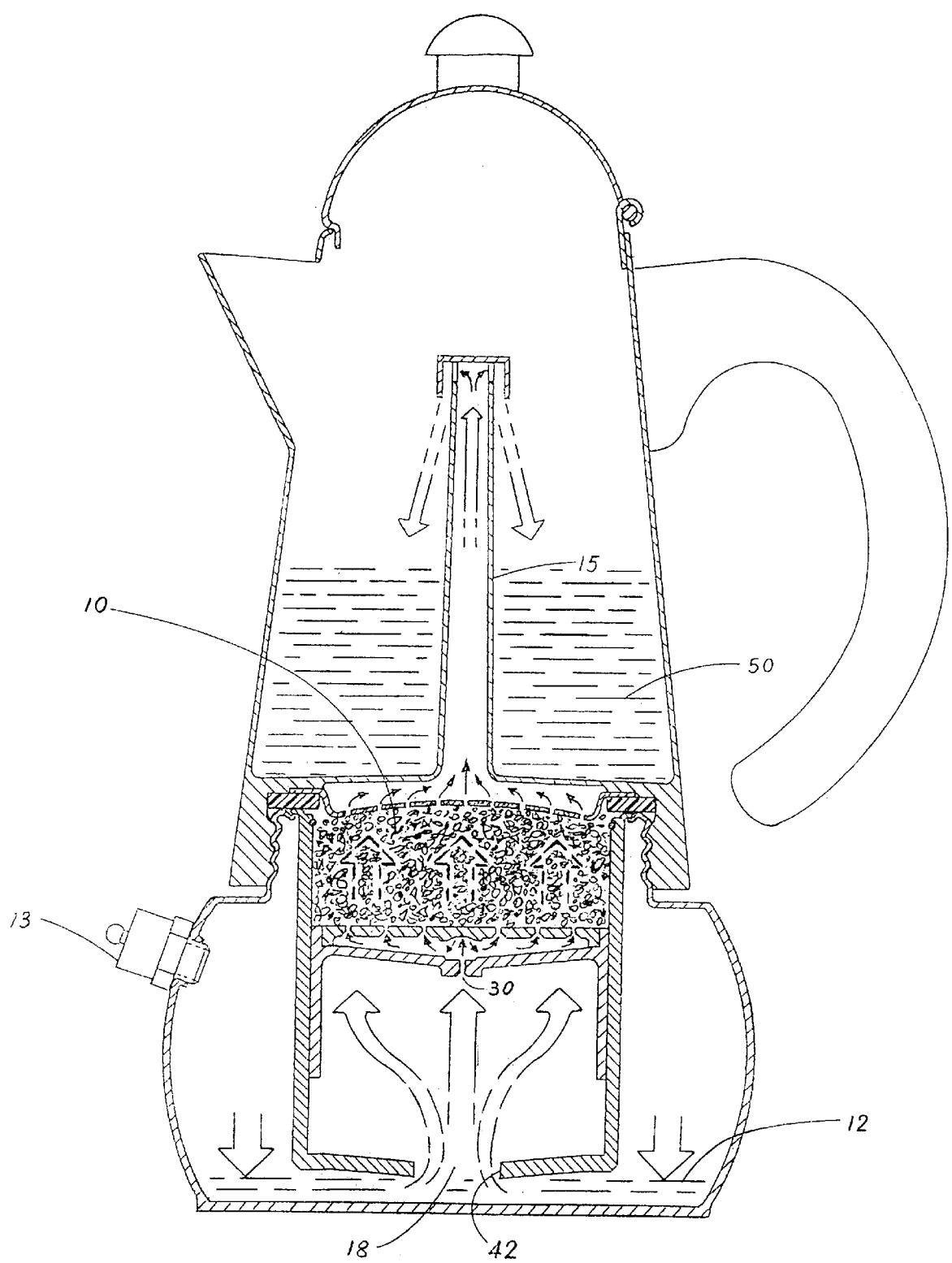
FIG. 3 is like FIG. 1, showing the beverage maker at a third later point in the brewing process.
Figure 7:
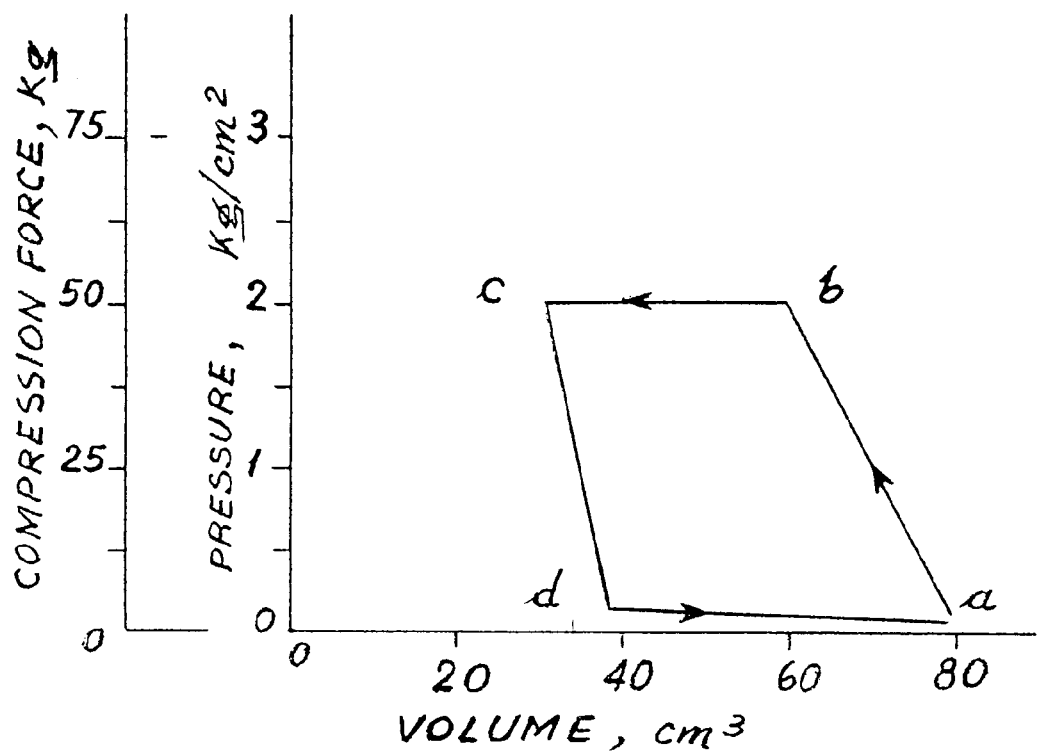
FIG. 7 is plot of typical pressure, volume and compressive force changes to which material placed in a piston-cylinder assembly are subjected during the brewing cycle.

FIG. 1–3 illustrate the progressive movement of the piston and flow of water and steam during the brewing cycle. FIG. 7 shows the nominal or idealized pressure-volume curve which characterizes the piston-cylinder assembly of the brewer. Nominal pressure, volume and compressive force values are given for a brewer which has the piston dimensions mentioned above, when coffee grounds are being processed.

As illustrated by FIG. 1, at the start, a measured quantity 12 of liquid water, for example about 350–400 ml, is placed in the lower container. The piston-cylinder assembly is then inserted within the lower container. A measured quantity of grounds—for example about 35 g by weight, or about 80 ml by volume of coffee grounds—is placed within the ingredient chamber 9 which is formed between the piston-cylinder assembly and the upper perforated plate. Grounds 10 are placed upon the diffuser plate of the piston when the piston is at its lowermost position. The upper container 2 is then screwed onto the lower container; and, heat is then applied to the lower container.

FIG. 2 indicates how, when the water is sufficiently heated, steam is generated in the lower container, exerting pressure on the surface of the liquid water 12 as illustrated by arrows 14. This initiates phase a-b of the brewing cycle, continuing into phase b-c. See FIG. 7. Liquid water is caused to flow through the opening 42 at the bottom of the cylinder as indicated by arrows 18. Liquid water passes through the nozzle 30 and holes 28 and through the grounds 10 (as indicated by the phantom arrows) which rest on top of the diffuser plate, thoroughly wetting them before there is substantial compression. Differential pressure across the piston causes the piston to move upwardly, increasingly compressing the grounds and making them more resistive to the flow of water. Therefore, the pressure rises during phase a-b. The liquid water which has passed through the grounds passes up the inverted funnel and through the opening 52 at the top thereof, to be discharged downwardly and accumulate as liquor, or beverage, 50 in the upper container. At the end of phase a-b, a peak pressure is reached. That pressure is a function of the heat rate of the lower container, the particular nozzle and hole areas, and the characteristics of the grounds in their compressed and wet condition. Typically, this peak pressure will range between 100–280 kPa. Temperatures associated with the peak pressure will range from about 120–140° C. With the passage of time, the continuation of pressure on the grounds causes them to compress while the pressure remains essentially constant, as illustrated by phase b-c in FIG. 7.

Figure 8:
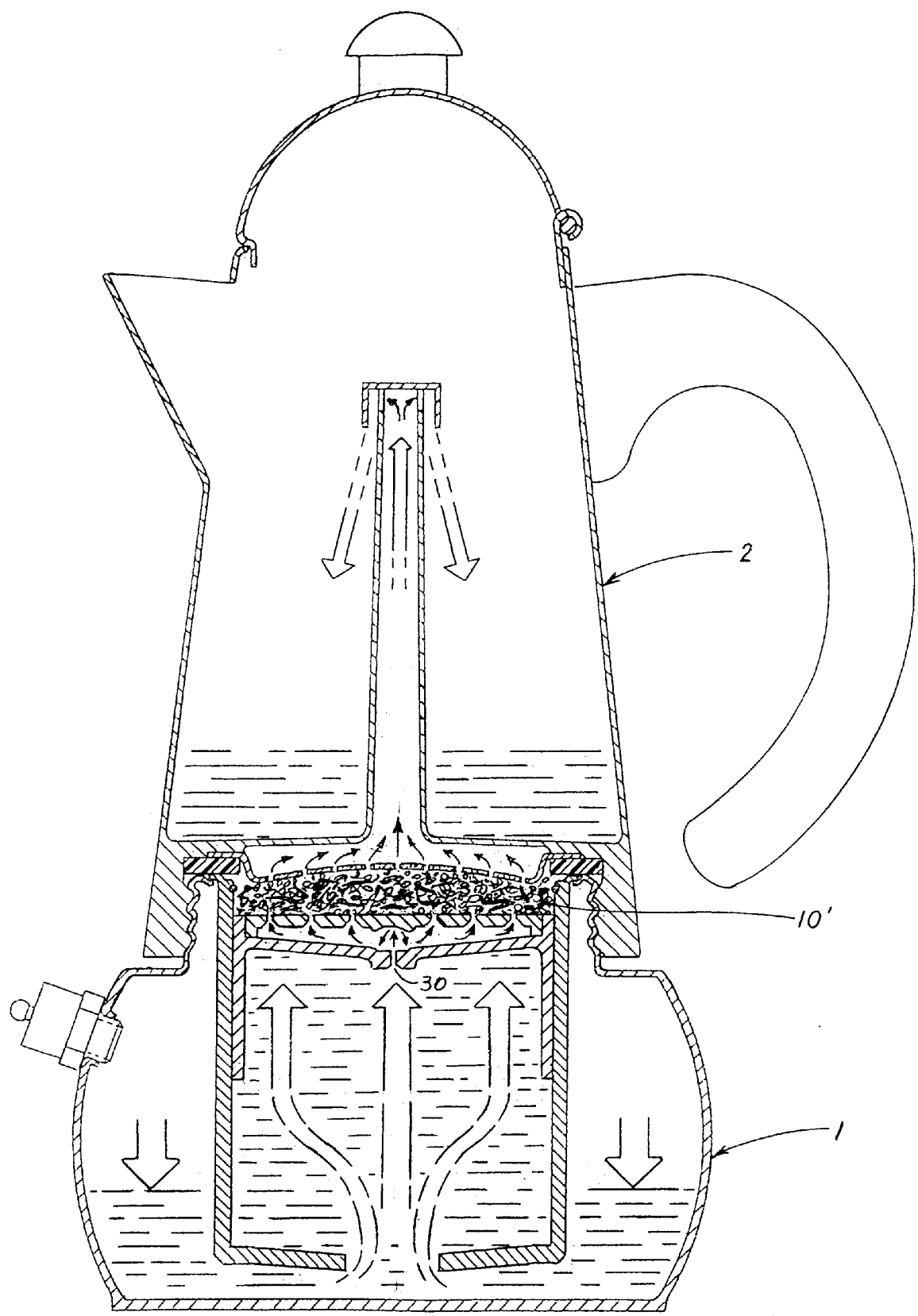
FIG. 8 is like FIG. 2, showing the beverage maker at a second point during the brewing process, showing how tea leaves tend to occupy a smaller volume when compressed than do the coffee grounds shown in FIG. 1–3.

Finally, the grounds are fully compressed at the end of phase b-c. FIG. 2 and 3 show the piston in its uppermost position. FIG. 3 shows that water remaining in the lower chamber has declined to just below the level of the bottom of the piston-cylinder assembly. In the maker of the example, about 50 ml of liquid remains in the lower container assembly. At this point indicated by FIG. 3, steam passes upwardly along the path just described, forcing most of the liquid water upwardly through the grounds and into the upper container. There will be a discernible hissing or bubbling sound. FIG. 8 shows the same stage as illustrated by FIG. 3, but indicates how the piston will travel upward further when a typical quantity 10' of tea leaves is used instead of a typical quantity of coffee grounds.

Then, since the extraction phase has been completed, the lower container is removed from the heat source, and the phase c-d ensues. See FIG. 7. The pressure drops, since there is no more steam being generated in the lower container. With the dropping in pressure in the lower container the piston drops to its start position, indicated by point a in FIG. 7.

Thus, to summarize, the extraction cycle is comprised of two phases. First, in phase a-b the grounds are subjected to rising pressure, and then in phase b-c they are subjected to constant pressure. In phase a-b, the gradually rising pressure desirably enables the loosely packed grounds to become thoroughly wetted before they are tightly compressed. During the phase b-c, there is transformation of heat into useful work. Thermomechanically, such a constant pressure cycle is generally characteristic of a machine having high thermal efficiency. At the end of the constant pressure phase b-c, superheated steam at a temperature of about 120–140° C. passes through the grounds, extracting hard to remove essences and substances, and carrying away most of the water. The superheated steam also provides a desirable sterilizing function for the piston, in particular for the decompression chamber 29.

In the coffee maker of the U.S. Pat. No. 5,586,484, there was no diffuser plate or decompression chamber. The piston top had a multiplicity of small openings, for instance, 32 holes of 0.17 mm dia, or 0.022 sq mm area each, for a total flow area of about 0.725 sq mm. The total flow area in the prior art piston was selected to achieve a desired compression-temperature cycle. That is, the hole area is made sufficiently small to obtain the desired pressure differential across the piston and resultant compression force on the grounds. However, a corollary of the design is that comparative high velocity water or steam jets from each hole directly into the grounds.

In the invention, the water and steam are decompressed in the decompression chamber 29, by the pressure drop through nozzle 30 of the piston top. Then, the steam flows at relatively low velocity through the holes of the diffuser plate, which holes can now be made larger than previously. This desirably lessens any potential for "jetting" or "channelling" of the liquid/vapor through the grounds, engenders full utilization of the grounds, and lowers manufacturing cost.

The piston top nozzle will range from 0.75–1.5 mm diameter. In a typical 350–500 ml brewer of the type described above, the diameter of the piston top nozzle 30 will desirably be about 1 mm, having an area of about 0.785 sq mm; and, the diffuser plate will have 32 holes of 0.8 mm diameter, for a total hole area of about 16 mm. Thus, the diffuser plate has a flow path cross sectional area about 20 times that of the piston. As a result, the major fraction of the pressure drop due to flow in the system is taken through the piston top nozzle 30, and thus across the piston top. Calculations show the fluid velocity through the nozzle will be 5–25 m/s. Thus, pressure difference in the device is dominantly applied to the piston top, to thereby produce the desired compressive force on the grounds.

The area of the openings in the upper perforated plate is at least nominally equal to or greater than the area of the openings in the diffuser plate. Preferably, the upper perforated plate has a flow area of at least two, and up to four times, the flow area of the diffuser plate. For example, it may have more than 300 0.5 mm diameter holes. The upper plate has only the function of retaining the grounds in the piston-cylinder assembly under the compressive force of the piston. The grounds themselves will provide some resistance to flow. However, the additional impedances of the grounds and upper perforated plate are not great compared to that of the nozzle. And, thus, whenever there is flow, the pressure in decompression chamber 29 is always substantially lower than the pressure in the lower container. Measurements indicate that even under conditions of highest flow and greatest flow resistance of grounds, the pressure in the decompression chamber will not exceed about 50 percent of the pressure in the lower container. Typically, it is in the range of 15–30 percent.

In the invention, the high temperature and pressure are desirably effective in extracting from the organic material placed in the piston-cylinder a greater quantity of essence per unit volume or mass than is achieved when greater than atmospheric pressure is not employed. Not only is efficiency increased—so that less raw material is required; but, it is believed that the high temperatures desirably extract from the raw material different proportions and combinations of essences than is possible with devices operating at essentially atmospheric pressure.

Although only the preferred embodiment has been described with some alternatives, it will be understood that further changes in form and detail may be made without departing from the spirit and scope of the claimed invention. In particular, variations may be made in the construction and design of the particular components, such as the piston, cylinder and diffuser plate, in carrying out the essential process and objectives which the invention has been described to satisfy.

I claim:

1. A device for brewing of beverages from grounds comprising:

a lower container assembly having an open top and a closed bottom;

an upper container assembly, for receiving brewed beverage, having a bottom end releasably connected to the top of the lower container assembly; the bottom end having an opening in communication with said lower container open top;

a perforated plate mounted proximate said bottom end opening, for preventing movement of grounds from the lower container assembly into the upper container assembly by way of said open top and said bottom end opening;

a piston-cylinder assembly positioned within the lower container assembly, for receiving grounds, the piston-cylinder assembly comprising (a) a cylinder, for slidably receiving a piston, having an upper end and a lower end, said lower end proximate the bottom of the lower container assembly, and said upper end proximate the top of the lower container assembly;

(b) a piston, positioned within the cylinder, having a top with a nozzle therethrough; the piston slidable within the cylinder from said lower cylinder end to said upper cylinder end, to thereby compress grounds placed within the cylinder against the perforated plate; and, (c) a diffuser plate having a multiplicity of through-holes; the diffuser plate attached to the piston top for pressing on the grounds when the piston moves upwardly; a portion of the diffuser plate spaced apart from the piston top, to create a decompression chamber therebetween.

2. The device of claim 1 wherein the flow path area of the holes in the diffuser plate is several times greater than the flow path area of the nozzle in the piston.

3. The device of claim 2 wherein the ratio between the diffuser plate flow path area and the piston flow path area is at least 20 to 1.

4. The device of claim 1 wherein, when liquid water is serially flowed during use from the lower container, through the piston nozzle, into the decompression chamber, and through the upper perforated plate, the pressure in the decompression chamber is substantially less than the pressure in the lower container.

5. The device of claim 4 wherein the pressure in the decompression chamber is between 15 and 50 percent of the pressure in the lower container.

6. The device of claim 1 wherein the piston has an H-shape cross section, the diffuser plate captured within the upper verticals of the H-shape.

7. The device of claim 2, wherein the piston top has a nozzle of 0.75–1.5 mm diameter, wherein the diffuser plate has a multiplicity of openings having a total area of at least 16 sq mm.

8. In a device, for making beverages from grounds during a brewing cycle, comprised of an upper container assembly and a lower container assembly mated thereto for receiving water at the start of the brewing cycle; the lower container assembly containing a cylinder within which is positioned an vertically movable piston; wherein the piston has a top with at least one opening for passage of water upwardly therethrough; wherein, water flows upwardly through the piston opening and grounds placed within the cylinder above the piston, and then into the upper container assembly as a beverage, during the brewing cycle, as the piston moves upwardly due to pressure generated by heating water in the lower container assembly; the improvement which comprises: a cylinder having an upper end and a lower end, said lower end proximate the bottom of the lower container assembly; wherein the piston is positionable within the cylinder in proximity to said bottom prior to any upward piston motion during the brewing cycle.

9. The device of claim 8, wherein the improvement further comprises: a diffuser plate, for contacting and pressing on grounds placed within the cylinder, mounted upon the piston and spaced apart from the top thereof to form a decompression chamber therebetween; the diffuser plate having a multiplicity of openings, the openings sufficient to provide a flow area which is several times the flow area of all liquid passage openings in the piston top, to thereby provide within the decompression chamber a pressure which is substantially less than the pressure in the lower container assembly during the time in the brewing cycle during which water flows through the grounds.

* * * * *